(12) United States Patent
Peterson (10) Patent No.: US 6,441,575 B1
(45) Date of Patent: Aug. 27, 2002

(54) AUTOMATIC TORQUE-BASED CONTROL SYSTEM

(75) Inventor: James E. Peterson, Lakewood, CO (US)

(73) Assignee: Barker Holding Company, LLC, Littleton, CO (US)

( * ) Notice: Subject to any disclaimer, the term of this patent is extended or adjusted under 35 U.S.C. 154(b) by 0 days.

(21) Appl. No.: 09/616,848

(22) Filed: Jul. 14, 2000

Related U.S. Application Data (62) Division of application No. 09/227,119, filed on Jan. 9, 1999, now Pat. No. 6,116,320.

(51) Int. Cl.$^7$ ................................................ H02P 7/00
(52) U.S. Cl. ...................................... 318/433; 318/266
(58) Field of Search .............................. 318/256, 264, 318/265, 266, 286, 430, 431, 432, 433, 434, 466, 467, 468, 469

(56) References Cited

U.S. PATENT DOCUMENTS

| | | |
|---|---|---|
| 2,843,691 A | 7/1958 | Champion et al. |
| 3,330,922 A | 7/1967 | Rowe ...................... 200/61.93 |
| 3,559,024 A | 1/1971 | Marder ........................ 318/467 |
| 4,085,345 A | 4/1978 | Bullat et al. ................. 310/117 |
| 4,319,236 A | 3/1982 | Brace et al. ................. 340/679 |
| 4,417,185 A | 11/1983 | Bullat et al. ..................... 318/2 |
| 4,429,264 A | 1/1984 | Richmond .................. 318/466 |
| 4,463,698 A | 8/1984 | Shinozaki et al. .......... 112/275 |
| 4,548,250 A | 10/1985 | Meharg et al. ............. 160/331 |
| 4,618,804 A | 10/1986 | Iwasaki ........................ 318/16 |
| 4,665,965 A | 5/1987 | Pasquier et al. ............. 160/310 |
| 4,758,824 A | 7/1988 | Young ........................ 340/566 |
| 4,807,686 A | 2/1989 | Schnebly et al. .......... 160/84.1 |
| 4,827,199 A | 5/1989 | Kaucic et al. ............... 318/491 |
| 4,852,627 A | 8/1989 | Peterson et al. ........... 160/84.1 |
| 4,856,574 A | 8/1989 | Minami et al. .......... 160/168.1 |
| 5,133,399 A | 7/1992 | Hiller et al. ................. 160/171 |
| 5,170,108 A | 12/1992 | Peterson et al. ............. 318/469 |
| 5,195,569 A | 3/1993 | Peterson et al. ........... 160/84.1 |
| 5,270,629 A | 12/1993 | Hsieh ........................ 318/600 |
| 5,535,867 A | 7/1996 | Coccaro et al. ............. 192/56.1 |
| 5,600,058 A * | 2/1997 | Preikschat et al. ......... 73/54.32 |
| 5,708,340 A | 1/1998 | Chang ........................ 318/480 |
| 5,793,174 A | 8/1998 | Kovach et al. ............. 318/468 |
| 5,825,144 A | 10/1998 | Suzuki et al. ................ 318/434 |
| 5,828,136 A * | 10/1998 | Yang .......................... 290/4 A |
| 5,950,364 A | 9/1999 | Hormann ....................... 49/26 |

* cited by examiner

*Primary Examiner*—Bentsu Ro
(74) *Attorney, Agent, or Firm*—Santangelo Law Offices, P.C.

(57) ABSTRACT

An automatic torque-based control system is disclosed which can react to end points and obstructions through a torque sensing arrangement. This torque sensing can be accomplished through use of an electromagnetic interference device so that a change in torque is immediately detected and a modulation in operation of the shade can be effected. Rotating pitched disks elastically connected to each other can be used to act as the torque sensor for drive systems, and in particular and preferred embodiments, for window shade systems. Multiple elastic elements can permit multiple location sensing as well as non-zero, no-load, and fully loaded torque sensing and reaction.

12 Claims, 6 Drawing Sheets

AUTOMATIC TORQUE-BASED CONTROL SYSTEM

This is divisional application claiming priority to application Ser. No. 09/227,119, filed Jan. 9, 1999, now issued as U.S. Pat. No. 6,116,320, hereby incorporated by reference.

This invention relates generally to the field of automatic window shades, that is window shades which are powered to achieve their motions. Specifically, it relates to automatic window shade operation which moves a shade usually up and down between top and bottom, or open and closed positions. It also discloses aspects which can be applied generally and in other applications as well.

I. BACKGROUND OF THE INVENTION

The window shade field is one which has constantly underdone a variety of improvements. These have ranged from mechanical developments such as that shown in U.S. Pat. No. 5,133,399 to those applicable to the automatic window shade field. In the automatic window shade field, variations have existed for a number of years. This can be demonstrated by two patents representative of the variation, U.S. Pat. No. 4,856,574 and U.S. Pat. No. 5,170,108. As shown in each of these patents, there has been awareness of a variety of issues. While relating only to a manually operated window system, U.S. Pat. No. 5,133,399 shows an awareness of shade load issues. In the automatic context, U.S. Pat. No. 4,856,574 shows both electric operation and automatic control of the window shade raising and window shade lowering. In the perhaps an atypical example of developments using different disciplines, U.S. Pat. No. 5,170,108 to the present inventor shows sophisticated automatic operation through the use of microprocessor control with other features. These include the integration of circuitry, programming, and even optics to achieve the desired operations. In spite of this approach, the field however typically involves developers—as well as the developments—that have not typically integrated knowledge from diverse disciplines to achieve the desired goals. Thus, while goals have been long sought, it has not always been an easy task for those within this field to achieve those goals.

Certainly, other unrelated fields have utilized techniques which might have been applied to the automatic window shade field. One of these unrelated fields is that of torque sensing in general. By this field, it appears that those skilled in that art have utilized techniques which sense changes in an application of torque and utilized those changes for some purpose. As evidenced by U.S. Pat. No. 2,843,691 issued in 1958, the diverse field of torque sensing has existed for some time. Perhaps to some degree indicating how diverse this field was actually viewed by those in the automatic shade field it can be seen that U.S. Pat. Nos. 4,085,345 and 4,417,185 issued over a decade ago have shown torque sensing arrangements which might, in hindsight, be viewed as immediately applicable to the automatic shade field. In spite of this, however, those in the automatic shade field have not applied these techniques to their own field. In spite of the fact that those in the automatic shade field have long desired the operations now made available by the present invention, and in spite of the fact that the techniques and devices shown in these, unrelated fields have long been available, those of ordinary skill in the field of automatic shade operation had not previously realized the potential advantages and applicabilities to their own field. Even fairly recent developments in the automatic shade field, such as U.S. Pat. No. 5,791,174, have not seen the possibilities now explained.

Perhaps to some degree, the problems and issues facing those involved in the automatic shade field have led those away from looking at other arts. For instance, the field of the present invention is one in which there are extreme cost and installation constraints. Not only must the devices be installed and manufactured for low prices, they also have acquired space and consumer considerations which other, more general fields have not often faced. The automatic shade field has also faced a desire for easier installation so that top and bottom operations can be achieved without a need for trained installation technicians and has faced a desire to be able to react to obstructions and the like in the operation of the shade. Even in their operation, the automatic window shade field may have to some degree been viewed as unique in that the specific operations and needs of consumers can often be quite different from those applicable to a more general field.

Thus the automatic shade field may be viewed as having faced a Iona felt but unsatisfied need for inventions which achieve what the present does. Perhaps surprisingly, as the present invention demonstrates, the implementing arts have been available in other contexts. They have, however, not been applied in the manner of the present invention to the automatic shade field. Similarly, when applied to the field of general torque sensing, the present invention poses advantages which also utilize diverse techniques that have not been applied to even that more general field. Perhaps each of these exists to some degree because in the relevant field full appreciation of what the problem was may not have been fully comprehended by those of ordinary skill. While substantial attempts had been made to achieve some of the ends now achieved, those of ordinary skill had apparently not fully appreciated the nature or fully understood the problems involved. To some degree their efforts may even have taught away from the direction taken by the present inventor and thus results might be considered unexpected. It may even be true that those of ordinary skill in the art might have considered their field so focused and so unique that they would have considered other fields as so distinct as to not be thought to have been generally applicable to this specialized field. In achieving the goals desired, the present invention represents not just a gradual improvement over the prior art but rather a significant advance in several critical understandings. These range from advances to understanding the types of sensing systems desired, the specific operations capable of being addressed, and the physical designs used to achieve the overall goals of such an invention. These understandings have even gone beyond the mere exercise of ordinary skill into new realizations that have permitted the present inventor to address problems previously unaddressed.

Perhaps one of the more interesting historical facts which shows that the present invention truly represents leaps in performance and applications of techniques which should not be considered as obvious or a mere extension of prior efforts is shown in several U.S. Patents to Jean Bullat. Even though this lone inventor had crossed both the torque sensing and shade operation disciplines, he had apparently not fully realized how the capabilities of these two diverse disciplines could be joined. As mentioned earlier, U.S. Pat. No. 4,085,345 represents a general torque limiting stop device invented by Jean Bullat. Some years later, this same inventor also invented an improved drive system for roll-up shades as shown in U.S. Pat. No. 4,417,185. Surprisingly, even he did not fully appreciate that the techniques of his earlier torque limiting stop device could be utilized and applied in the automatic shade field. While the concept of torque reaction had been well shown in the earlier invention, it simply was not applied to the automatic shade field in his subsequent invention. As the present invention demonstrates, this cross utilization of techniques affords significant advantages. While the present invention shows that the use of torque can control both top and bottom operation of a shade as well as obstruction operation, prior to the conception of the present invention, the two fields were not even applied by the one inventor who had been active in both fields. Even beyond the use of torque to control operation, the present invention makes further advances in the utilization of electromagnetic radiation in a fashion for high efficiency and practical implementation. The present invention even goes beyond techniques in either of the two fields involved by that other inventor. Thus, until the present invention, it appears that there was no automatic shade end sensing operation which utilized torque as its control basis and no automatic shade operation which had the capability of reacting in this fashion to obstructions and the like. Even in the more general field of torque based sensing there had apparently been no use of electromagnetic control features as shown in the present invention.

II. SUMMARY OF THE INVENTION

Accordingly, the present invention provides an automatic shade system which can utilize torque control operations in a variety of ways and at a wide range of points. The designs shown disclose torque sensing elements which utilize electromagnetic radiation and an alteration in that radiation to precisely sense small changes in torque as may be incidental to automatic window shade operation. In addition, the device discloses torque sensing elements which may be applied generally and in other fields as well. As those in the torque sensing field would readily understand, these designs can utilize optical interference and the like and can be configured in a variety of ways to achieve goals in a variety of applications.

Thus one object of the invention is to achieve window shade systems which are practical from both consumer, manufacture, and installation perspectives. In keeping with this object it is a goal to provide an automatic window shade which can automatically set itself to operate between top and bottom limits and which can automatically react to an obstruction which might inadvertently be placed in the path of window shade operation.

It is also an object of the invention to provide practical enhancements such as improved battery life as well as to provide designs which can be uniformly applied across a variety of window shade designs and applications.

In a more general context it is also an object of the invention to provide torque sensing capabilities which may be applied in a variety of situations. The disclosure thus explains and has inherent to it a variability which can permit the designs to be altered and adapted as a specific need may require.

Naturally further objects of the invention are disclosed throughout other areas of the specification and claims.

IV. DESCRIPTION OF THE PREFERRED EMBODIMENTS

Figure 1:
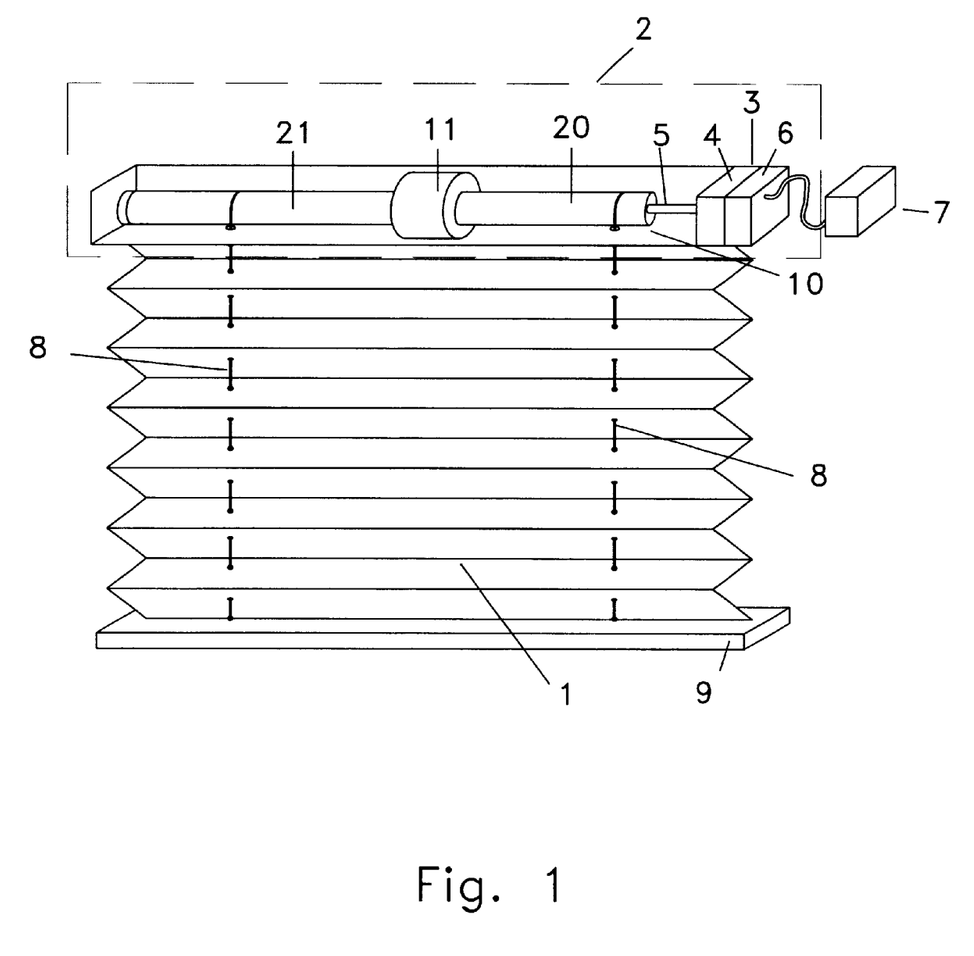
FIG. 1 is a schematic depiction of one shade system according to the present invention which depicts a torque sensing element located remote to the motor and pleated shade adaptations.

As can be seen from the drawings, the basic concepts of the present invention may be embodied in different ways. While some devices are disclosed, it would be understood that these not only accomplish certain methods but also can be varied in a number of ways. Importantly, as to all of the foregoing, all of these facets should be understood to be encompassed by this disclosure. FIG. 1 shows a schematic of a shade system according to the present invention as it might be configured for a pleated or tubular shade design. The basic operation of this system regardless of how configured—can be understood starting with this figure. As shown, window shade (1) may be operated through some type of drive system (2). Through proper configuration, the window shade (1) can be arranged to have window shade movement such that window shade (1) may achieve some type of operation. As shown in FIG. 1, the operation is most simply understood as movement between open and closed, or top and bottom, positions. Thus, the drive system (2) and the window shade (1) may be connected and each established for automatic window shade operation.

The automatic operation of the window shade may be controlled through a variety of techniques such as switches, remote controls, timed operation, and other aspects as those of ordinary skill in the art of automatic window shade operation well understand. The drive system (2) can also be configured with some sort of power source (7) and may utilize an electric or other type of motor (3) to achieve operation. The motor (3) may include a motor housing (4) and may operate a drive shaft (5) as part of the over all drive system (2). As one can easily understand, the drive system (2) may supply torque which is applied through the drive system (2) to operate the window shade (1). Thus, motor (3) may feed torque through drive shaft (5) to turn elements within the drive system (2). As mentioned earlier, this torque can then be used as a basis for control.

In operation, the window shade (1) is usually operated through the drive system (2) to both a fully closed position such as might exist when the shade is fully retracted to a top position and a fully opened position such as when the shade is let out to a bottom position. Usually the top and bottom positions are arranged such that they coordinate with the window which the shade is designed to cover.

In an automatic window shade application, the drive system (2) may be modulated in some regard. In the present invention this modulation exists through some type of drive modulator, shown as a control system (6). If electrical, both the control system (6) and the drive system (2) may be powered in some fashion through the power source (7). This power source may be either a battery element or some type of line or transformed line power. The control system (6) can be configured to act in response to some type of sensing operation to modulate the drive system (2) and thus the operation of window shade (1). One significant aspect of the present invention is that the modulation of the drive system (2) in response to some sensing operation can be not only a change in the torque applied through the system but also some type of change in an electromagnetic signal.

By focusing on the torque applied through the drive system (2), the present invention can achieve torque based control, namely, control which in some fashion responds when there is a change in the torque applied through the system. As explained in more detail later, this is achieved by elastically absorbing at least some of the torque applied and creating a change as a result of that elastic absorption. The control system (6) can then react to this event and alter operation accordingly.

Figure 2:
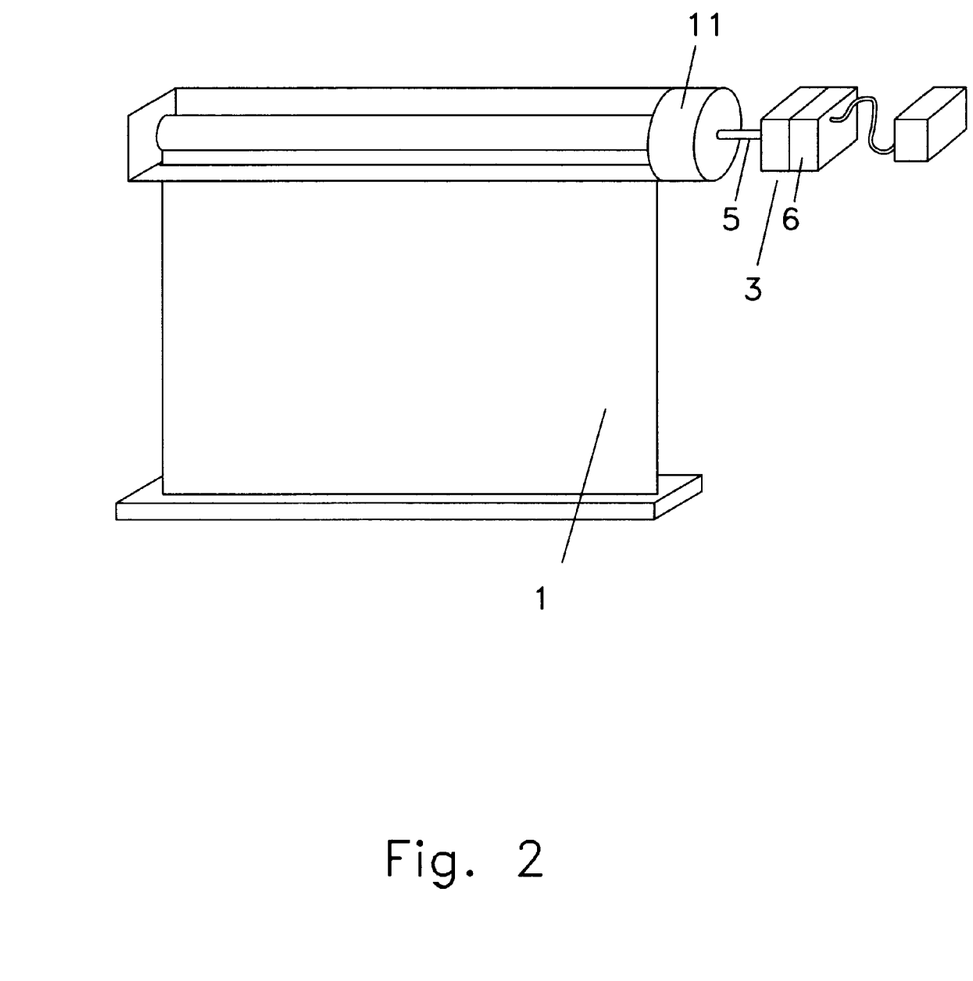
FIG. 2 is a schematic depiction of another shade system according to the present invention which depicts a torque sensing element located apart from a shade tube and solid shade adaptations.

As shown in FIGS. 1 and 2, the design may be configured for different types of shades. FIG. 1 shows a pleated shade design. As those skilled in the art readily understand, the pleated shade design may include take-up cords (8) to act on a bottom rail (9) or some other lower portion of the window shade (1). The take-up cords (8) can then be pulled in by the drive system (2) to effect retraction of the shade. Ultimately, the bottom rail (9) may meet some top element (10) at which point the shade may be considered fully retracted and the window shade open. As shown in FIG. 1, in this arrangement the design may utilize at least two take-up cords (8). Certainly more or less take-up cords (8) can be configured as the specific design dictates. As shown in FIG. 2, a solid shade configuration, or sheet-like configuration, of window shade (1) can also be achieved. In this design no take-up cords may be used and the entire shade itself may structurally retract or even be rolled over some element. Thus in FIG. 1 while the take-up cords (8) are an element through which the torque is applied to the window shade (1), in FIG. 2 the shade itself may serve as one of the elements through which the torque is applied.

As those involved in the automatic window shade field well understand, installation and operation of an automatic shade can be somewhat sensitive. First, in installing the window shade it may be necessary to configure or adjust the overall system such that top and bottom are appropriately set. The present invention may obviate this need. Furthermore, for some designs it may also be necessary to establish operation so that the shade automatically knows where to alter operation of the shade such as for an open window or the like. Again, the present invention may be configured so as to pose a complete solution to each of these and to make installation easier for the consumer. It can do this through automatically establishing the appropriate end parameters and even altering those as the need arises. It can also achieve other operations such as obstruction sensing and the like.

In its automatic end sensing feature, the present invention can operate to automatically sense when the window shade (1) has reached an end point and then to automatically stop any movement of the window shade (1) at this end point. Thus, the design can provide an end point sensor which stops operation when the window shade (1) is at at least one of the ends of operation. This end may be the top, such as in an open window shade configuration, or it may be the bottom, such as in a closed window shade configuration. In these modes the sensor may serve as a top sensor and/or as a bottom sensor.

Perhaps a new mode of operation now possible is that of obstruction sensing. As anyone who has utilized a window shade should know, the window shade could encounter an obstruction either when it is being unfurled or retracted. While this obstruction usually poses no problem in a manual operation mode, in automatic operation there may be no person physically present at the window shade who can solve the problem the obstruction poses. [Or worse yet the "obstruction" may actually be an intentional act—such as those with small children might readily appreciate.] Such a perplexing problem has existed since automatic window shades were first used in a consumer setting. It may even be considered that automatic operation of window shades have long had the goal of addressing such obstructions. The present invention can provide an obstruction sensor in which the movement of window shade (1) can be stopped at any position. Thus, the invention presents a window shade which automatically responds to an obstructing action. It can modulate the operation of window shade (1) through the control system (6). Referring to FIG. 1 such an obstruction can be most easily understood in an operation where the window shade is being let out to cover the window. Should window shade (1) encounter an obstruction on one side, one of the take-up cords (8) may continue to operate and yet the window shade (1) on that side may not continue to be let out. This can happen anywhere between the top and bottom positions. It can also occur in non-window shade applications.

The present invention not only senses when the item encounters an obstruction, but it can shut off the system when the item reaches that obstruction. This may be accomplished through sensing the torque at some location in the drive system (2). As shown in FIGS. 1 and 2, the general method of sensing an obstruction and automatically reacting in an appropriate fashion to that obstruction may be accomplished through some type of electromagnetic alteration element (11). As those of ordinary skill in the automatic window shade or other art would readily understand, the action of sensing the obstruction may even be configured to discriminate based upon the nature, location, repetitiveness, or other characteristic experienced as a result of the obstruction to alter the reaction. For example, the control might be programmed to retry the operation initially sought, to return to a prior position, to simply shut off, or the like. By configuring the electromagnetic alteration element (11) appropriately, it may also be responsive to the drive system (2), the drive shaft (5), the motor (3), or more specifically even the motor housing (4). As shown in FIG. 1, the electromagnetic alteration element (11) may be configured remotely to the motor (3). As shown in FIG. 2, the electromagnetic alteration element (11) may also be configured at other locations such as on or near the drive shaft (5) or even at the motor (3).

As mentioned earlier, the present invention may utilize electromagnetic radiation in its sensing context. This electromagnetic radiation may either be an ambient radiation or a specifically established source of radiation. When torque changes, the electromagnetic radiation can be altered through the use of the electromagnetic alteration element (11) such that the over all system can sense that change in torque. This alteration may in some fashion affect the electromagnetic radiation. This could range from complete blocking of the electromagnetic radiation to merely altering its spectrum in some fashion. As explained in specific detail later, the electromagnetic alteration element (11) may essentially create a change in an electromagnetic signal.

As alluded to earlier, the electromagnetic radiation may either be ambient or a supplied radiation. Usually it may be preferable to include some type of electromagnetic source so that sensed radiation can be accurately controlled. By establishing an electromagnetic source which emits a known electromagnetic spectrum, it is possible that a change in this spectrum could indicate a change in the torque through the system. This change could be a complete blocking of transmission, a change in wavelength, or a change in spectral distribution. Generally, where an electromagnetic source is used, this source would preferably be configured so that electromagnetic radiation would pass in the vicinity of the drive system (2) to facilitate the sensing. Remote sensing is possible. When the electromagnetic radiation passes in the vicinity of the drive system, it establishes a path, convoluted or not, which may lead from the source to a sensor. The changes in torque can result in an event which acts to interrupt or to create an interference in this path.

As mentioned above, it may be practical to utilize some type of light source as the electromagnetic source. Thus a light emitting diode (12) as shown and described further in reference to the other figures may be utilized. This may be in the visible, infrared, or other segment of the electromagnetic spectrum. Regardless of the type of electromagnetic source used, when an electromagnetic sensor (13) detects a change, that change can act to operate a drive modulator or some type of control system (6). Thus the drive modulation which occurs may be responsive to either the electromagnetic sensor (13) or to the electromagnetic alteration element (11).

Figure 3:
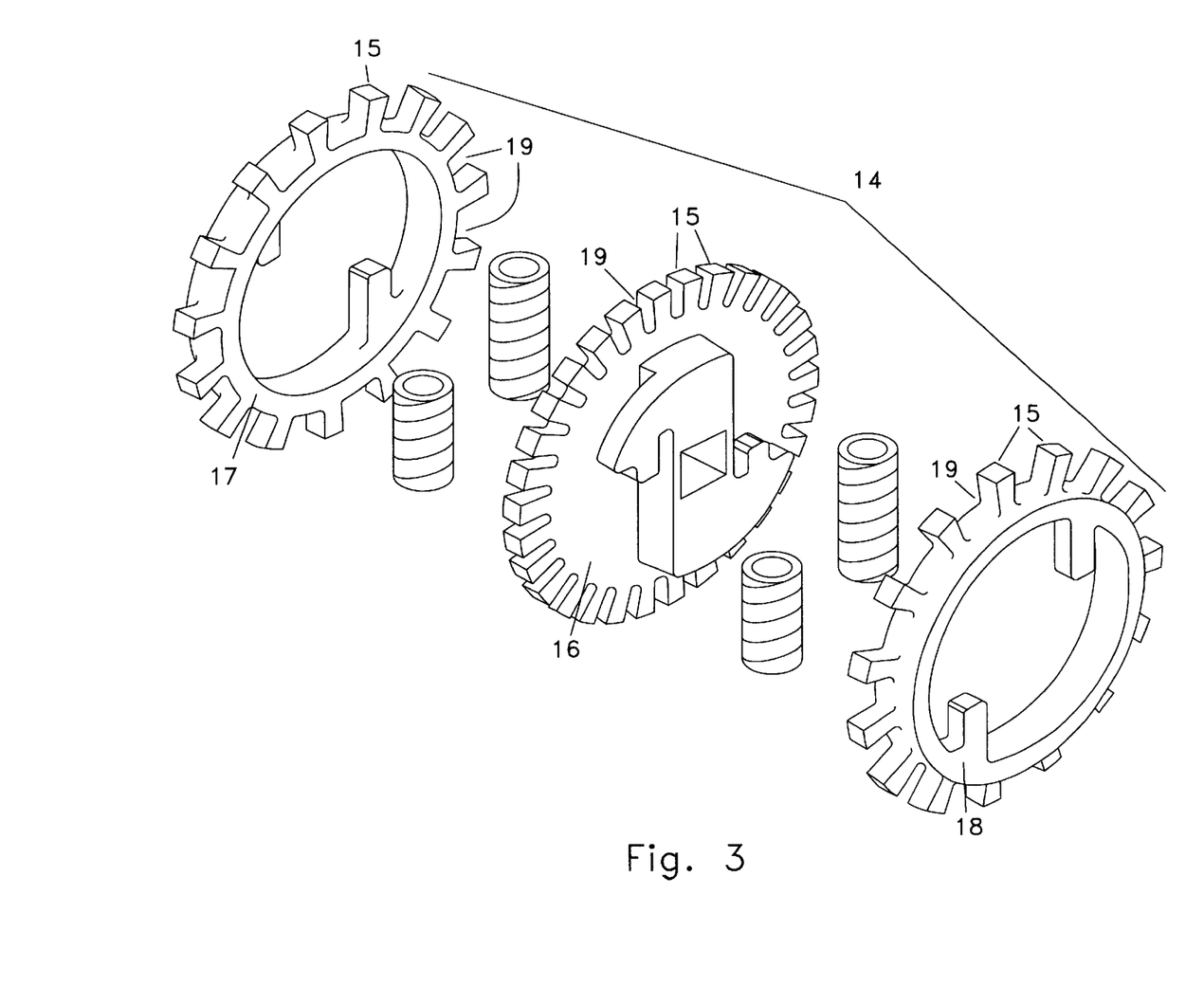
FIG. 3 is an exploded view of one embodiment of a torque sensing device according to the present invention.
Figure 4:
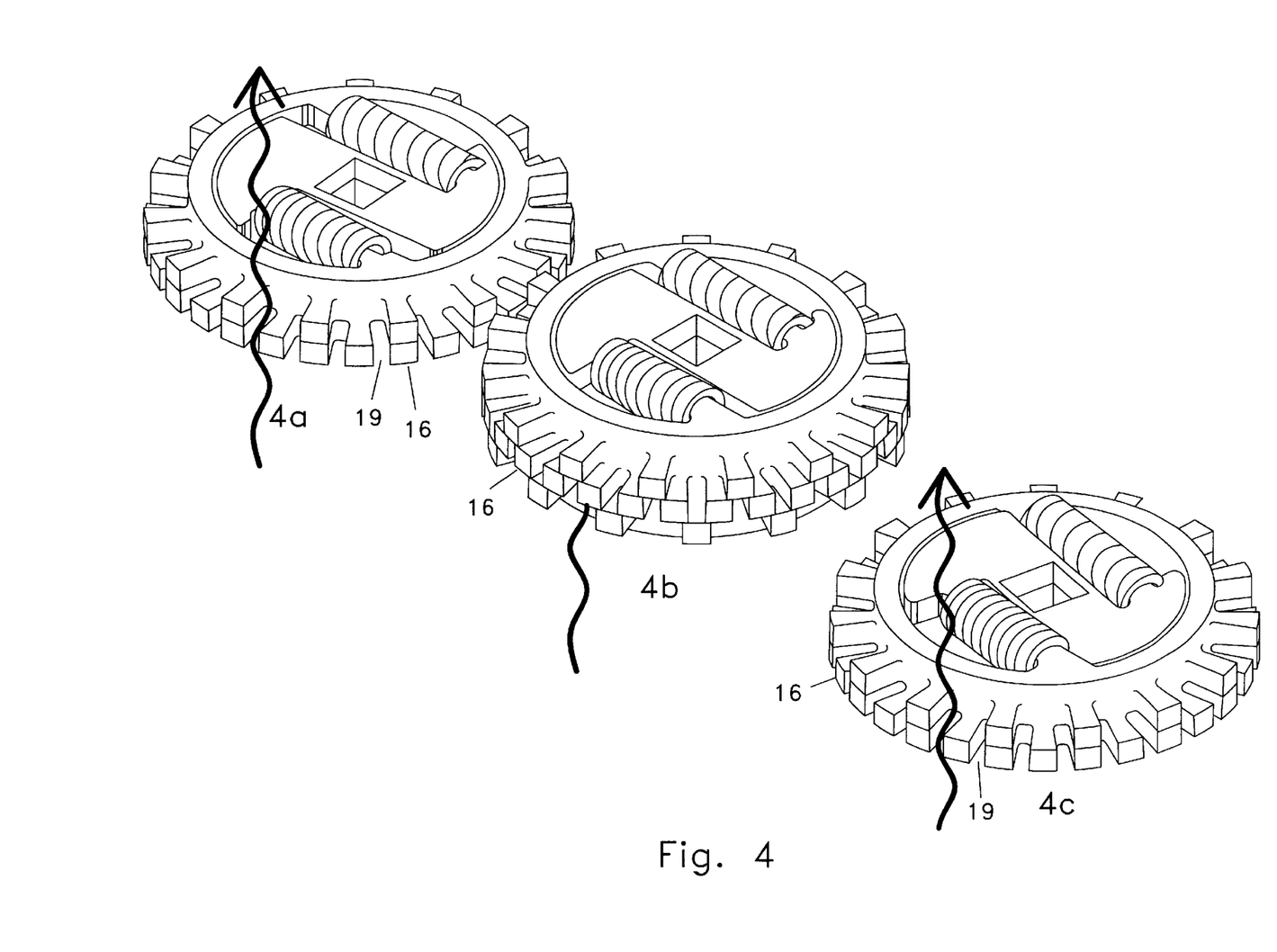
FIG. 4 is an perspective view of operational modes of the embodiment shown in FIG. 3.
Figure 5:
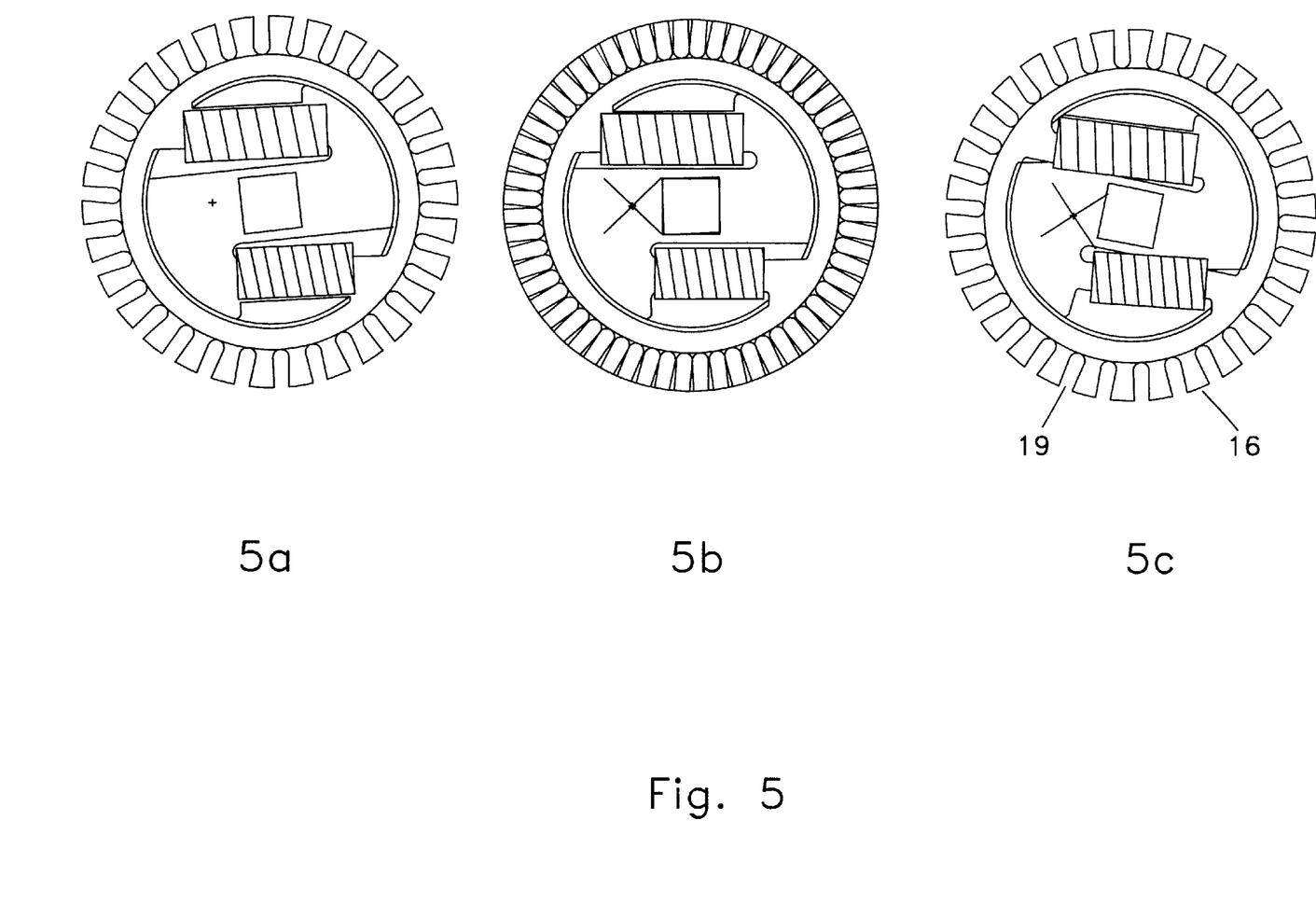
FIG. 5 is an end view of the operational modes of the embodiment shown in FIG. 4.

One embodiment of a design according to the present invention is shown in FIGS. 3, 4, and 5. In general, the device can present an electromagnetic interference device (14) which can serve as one type of electromagnetic alteration element (11). As can be understood from the figures, the electromagnetic interference device (14) can include a number of radially pivoting elements (15). These elements may rotate or may pivot relative to some other such element to achieve the desired effect. [Whether they actually pivot or not in some specific frame of reference, their movement relative to another would be considered pivoting in this context.] Radially pivoting elements (15) may be attached or integral to a number of disks as shown so as to present a variety of slotted or pitched disks. Referring to the central disk as the driving disk (16), it can be seen that the first radially pivoting element (17) and a second radially pivoting element (18) can respond to the driving disk (16). This response can be through some type of elastic element as discussed later. In order to be configured to sense torque changes, either one of the radially pivoting elements can be permitted to move with respect to some other elements such as the driving disk (16). Thus, the radially pivoting element may absorb at least some of the torque to achieve the desired effect.

As further shown in FIGS. 3, 4 and 5, the radially pivoting elements may be configured so that they each have an axis and may be axially adjacent to each other. Similarly, at the outer edges of either pivoting element, (17) or (18), or the driving disk (16), the electromagnetic interference device can present its electromagnetic alteration projection such as the radially pivoting element (15) radially adjacent to an ambient area (19), that is, an area which permits the electromagnetic radiation to pass unaffected.

Referring to FIGS. 4 and 5, the operation of the device can be more easily understood. In these figures, FIGS. 4(a) and 5(a) and FIGS. 4(c) and 5(c) each depict an event in operation where the electromagnetic interference device (14) is no longer interfering with the electromagnetic radiation. In the configuration anticipated (but not required) this would represent an event where the control system (6) might be operated to cease operation of the drive system (2) and thus stop the window shade (1) or other item. In FIGS. 4(c) and 5(c), the window shade might have either reached an obstruction (such an obstruction might hold the shade down or hold it up) or might have reached one of the end points. FIGS. 4(c) and 5(c) depict a "zero" torque situation (e.g. a low amount of torque relative to the normal motion operation of the system) in which a bottom or blocking obstruction were encountered. In such an arrangement, the radially pivoting element would pivot with respect to the driving disk (16) such that some elastic element (or elastic elements) would permit it to rotate and to stop blocking the electromagnetic radiation through the ambient area (19). This would represent a system which was configured so as to be activated by the presence of an electromagnetic radiation.

Thus, in this type of arrangement, the electromagnetic radiation would pass through the ambient area (19) and might activate the system to stop operation of the window shade (1) or other item. There would be an alteration of the electromagnetic spectrum to indicate a change in torque and thus cause modulation of the system. Similarly, FIGS. 4(a) and 5(a) depict a situation in which the window shade (1) or other item may reach a top or other high load condition and thus present a higher than normal amount of torque. In this instance, the elastic element would be compressed such that, again, the radially pivoting element would move away from the ambient area (19) and thus permit electromagnetic radiation to pass through unobstructed. This sensing could then further indicate either a restricting obstruction or encountering the top element (10) of the window shade (1) or other item.

To complete the discussion of the operational modes, FIGS. 4(b) and 5(b) represent an operational mode in which normal torques are experienced by the system. In a system in which the presence of electromagnetic radiation were an indicator of a non-normal condition, the radially pivoting element would be positioned, through proper selection of features, such that it blocked the ambient area (19) and thus did not permit electromagnetic radiation to pass from the electromagnetic source such as light emitting diode (12) to an electromagnetic sensor (13). By selecting the width of the radially pivoting elements and the ambient area (19) appropriately, and by selecting the elastic element such as the springs shown appropriately, the normal mode of operation can be arranged to have a broad enough range of torque such that not only may all ranges of torque typically encountered be accepted but the device might be configured for use in a variety shade systems or other applications without alteration.

To understand the multiple location sensing feature of this embodiment, it should be noted that FIGS. 3, 4 and 5, show both a first radially pivoting element (17) and a second radially pivoting element (18). The basic need for this feature can be understood most easily by considering the fact that in a pleated shade arrangement, two or more take-up cords (8) could be included. Since either take-up cord (8) might encounter an obstruction without the other take-up cord (8) reacting to that obstruction (e.g. a twisting shade) it may be desirable to have two sensors which can react independently of one another. This can be achieved by using both the first radially pivoting element (17) and the second radially pivoting element (18). Either of these radially pivoting elements can thus act to remove themselves from interfering with the electromagnetic radiation by moving relative to the driving disk (16). This would permit electromagnetic radiation to pass through the device. Thus, the over all system could achieve the desired result regardless of whether one or both take-up cords were affected.

As shown for this embodiment, the multiple location sensing feature can be achieved by utilizing concentric shafts such as shown in FIG. 1. Thus, a first shaft assembly (5) might be concentrically located within a second shaft assembly (20) which might each join at the electromagnetic interference element (11). While the first shaft assembly (5) might drive the driving disk (16), the second shaft assembly (20) might be connected to the second radially pivoting element (18) so that any displacement between the second shaft assembly (20) and driving disk (16) could be detected by the electromagnetic alteration element (11). Similarly, to permit two independent sensing locations such as might be desirable when there are two take-up cords (8), a third shaft assembly (21) might be configured so as to be connected to the first radially pivoting element (17) and likewise be driven by the connection between the first radially pivoting element (17) and the driving disk (16). Each of these connections may of course be expanded or contracted in number to achieve the desired result. Thus, in the design shown in FIG. 3, three radially pivoting elements may be used (16), (17), and (18). This permits two independent sensing locations when pitched disks such as those shown are used. Through this type of design the electromagnetic interference device (11) can be responsive to at least two take-up cords (8).

As those of ordinary skill in the art would readily understand, the designs shown can be altered such that only one location is sensed. This would of course diminish the number of components necessary. It might also facilitate locating the electromagnetic interference device (11) at other locations. As shown in FIG. 2, the electromagnetic alteration element (11) could be configured so as to be responsive to only one shaft assembly. This might be appropriate for a solid shade or other item. In this type of design, less than three pitched disks might be required. In applications in which motor (3) might be desired to be remote to the item to be operated or in which control system (6) might be desired to be located elsewhere, the electromagnetic interference device (14) could be located on a shaft completely remote from the motor (3). Similarly, the electromagnetic alteration element (11) might rotate or not. In a rotating configuration, such as shown in FIGS. 3, 4 and 5, the entire device might rotate with the drive system (2) as it passes through the electromagnetic radiation. The electromagnetic alteration element would thus present a rotating element attached to a drive shaft. Conversely, the electromagnetic alteration element (11) might also not rotate such as in an application where it were configured as to be located at the motor (3) similarly to that shown in the mechanical torque sensing reference discussed above. In this regard, the electromagnetic alteration element (11) might present a stationary projection mounted on the motor housing which, through an appropriate selection of flexible mounting elements or the like, could flex or move when an inappropriate amount of torque were applied through the system by the motor (3).

As explained earlier, the electromagnetic interference device (14) can be configured to create an interference in the path of the electromagnetic radiation. This interference could be any broad type of change in the electromagnetic radiation ranging from blocking to merely a change in the spectrum. By creating this interference in the path of the electromagnetic radiation, torque can be easily sensed even in a rotating system. As one can understand when they consider optical interference patterns due to differentially rotating disks, this interference can be selected to be extremely sensitive as well. It may also be selected so as to present an optical interference device and thus utilize optical radiation in its operation.

Referring to the device shown in FIGS. 3, 4 and 5, it can be seen that there may be some elastic absorption of the torque. In that device there is at least one elastic element. Specifically because it may be desirable to present an interference situation in normal motion operation with some torque applied through the system, the elastic element may be a plurality of springs. In the device shown in FIGS. 3, 4 and 5, these springs can be compression springs as shown in which one compression spring absorbs a low amount of torque so as to block the electromagnetic radiation by displacing a pivoting element with respect to the driving disk (16), while simultaneously the other compression spring serves its purpose by elastically absorbing some of the torque when that torque exceeds a top end torque anticipated to be experienced by the system in normal motion. Thus, the elastic elements can permit radial and elastic displacement to occur to achieve the interference desired. [Note that, by the term "radial displacement" it is not meant that the element must move along a radius, but rather that that radius itself might be pivoted to achieve the interference.] This, of course, should not be viewed as limiting, however.

In the fully loaded, but still normal motion operational mode, the heavier spring could be on the verge of compressing enough to permit the pivoting element to pass electromagnetic radiation. Similarly, in a "zero" or no-load condition, the lighter of the compression springs could force the pivoting element away from the ambient area (19) and also permit the electromagnetic radiation to pass. Thus there could be both expanded and loose conditions for the spring when the window shade (1) is at a fully closed position and when the window shade (1) and the bottom rail (9) encounter the window sill. In this configuration, one spring might be loaded during a first loading process and the second might be loaded after the first spring were compressed to a greater degree. Naturally in using the term "loaded" it should be understood that while the spring may experience some load, it is only significant amounts of load relative to the operation desired that is referenced. Importantly, as the spring compressibly absorbed at least some of the torque, it would permit the interference to be affected. In this specific embodiment it can be seen that the springs may represent internal springs and thus be configured within the entire device. This has an advantage in design as well as shielding the springs from external influences. They may be configured between the first and second pitched disks in a manner such that while there may be a driving disk (16) in between them, they still represent configuration between the two reactive elements.

Finally, as one of ordinary skill in the art could easily understand, by adjusting the various strengths of the springs and the overlap of the various radially pivoting elements, different design roles can be achieved. The system can thus be varied depending upon the application desired. Similarly when one design is used for a variety of applications, it may be possible to adjust the shade or other item itself such as adjusting the weight of the bottom rail (9). In this fashion, small shades might be configured so that in normal operation a torque amount for a large shade would be experienced without any need to adjust the size or strength of the elastic elements used in the electromagnetic interference device (11). This might serve the advantage of avoiding any need to change microprocessor programming and to permit accommodation to counterbalancing springs and the like.

Figure 6:
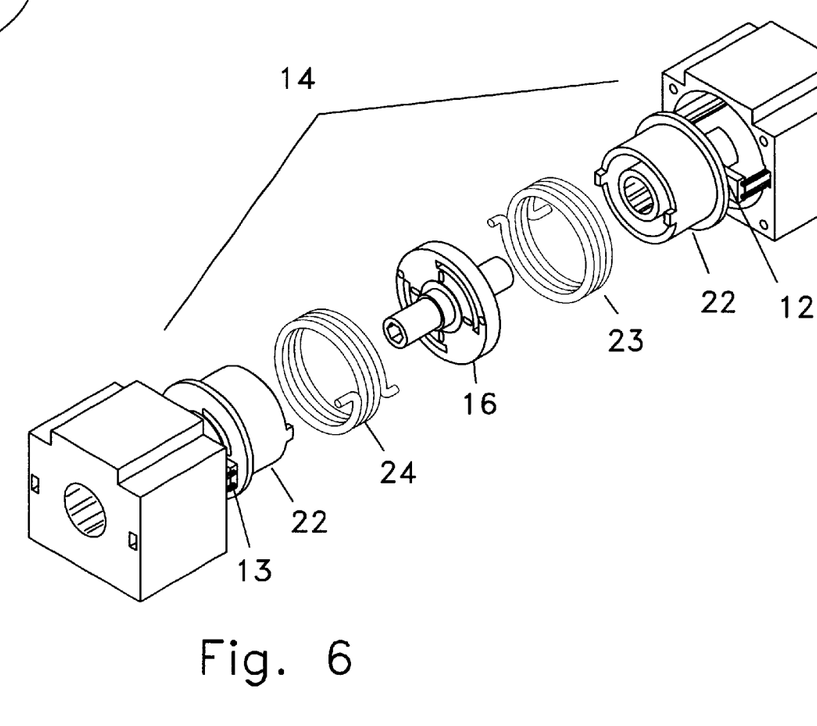
FIG. 6 is an exploded view of another embodiment of a torque sensing device according to the present invention.
Figure 7:
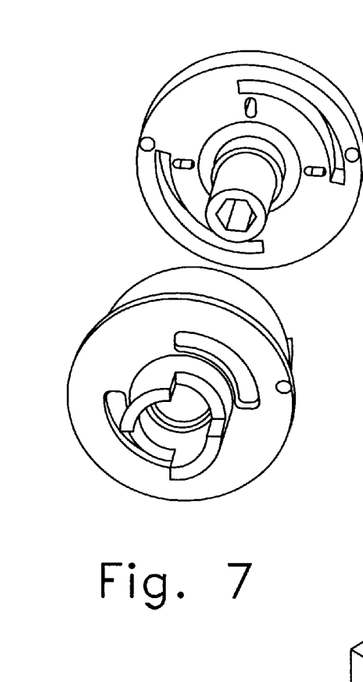
FIG. 7 is an perspective view of two elements of the embodiment shown in FIG. 6.

While the general operation of the device can be perhaps more easily understood from FIGS. 3, 4 and 5, one of the many possible alternative embodiments is shown in FIGS. 6 and 7. This operates much the same, however, instead of presenting pitched disks and compression springs, it may present slotted disks and torsion springs. As shown, the slotted disks (22) may be configured around a slotted driving disk (16). These may also be connected by first and second torsion springs (23) and (24) which may serve to permit the elastic absorption desired. While the use of a singular spring or one of the slotted disks may represent a less accurate amount of control for the electromagnetic interference device (11), this may be adequate for some applications. Further, this type of design also permits one to understand how a singular spring or elastic element could be used with less than three disks. By eliminating one of the slotted disks (22) and one of the torsion springs (23) or (24), a design can be accomplished which utilizes the slotted driving disk (16) and only one slotted disk (22), a single light sensing system could be easily achieved. A similar alteration would naturally be possible for the prior embodiment as well. Further, as shown it can be understood how the design could be housed to regulate external influences. It may also be helpful to notice that the first and second torsion springs (23) and (24) are left handed and right handed to permit the appropriate effects. By using torsion springs (23) or (24) which permit a high degree of rotation and by using slotted disks (22) in which the slots themselves are relatively large, a greater degree of rotation is possible. This also has the added advantage of being both cheaper and easier to make.

Regardless of the specific type of electromagnetic interference selected, modulation can be achieved in very efficient manners. In systems which utilize microprocessors, minimal code and thus minimal memory may be necessary. In fact, it is envisioned that only a few lines of code are necessary to permit shutoff control as desired with this device. Thus, the programming of the micro-processor can be greatly simplified. Furthermore, even though tailored devices can be designed, it may be desirable to use one device regardless of the application. A multiple location sensing device could be used even though sensing at only one location was necessary. Thus one design can be used in a variety of applications. Further, in the modulation event, upon sensing an obstruction or reaching an end point, the entire power to the system can be shut off. Thus the control system (6), can serve as an end point shut off, an obstruction shut off, a bottom shut off, or a top shut off—or any combination of the above. Furthermore, by configuring the system to completely shut power off, the control system (6) can serve as a battery protection element by removing any drain on the battery. This can be significant as it is well known that a short circuit arrangement as can often be experienced in a stuck motor situation. This can rapidly drain and kill any batteries that might be involved.

In operation for a shade system, one might even include a time delay aspect so that in the event the electromagnetic alteration device (11) were not to relax off of an uninterfered configuration, when the shade operation is re-started, the control system (6) might momentarily ignore a "stop" command. It would thus rapidly begin operation and permit the electromagnetic interference device (11) to reconfigure itself into a normal operation mode. Similarly, in addition to adjusting the device itself, threshold levels for sensing electromagnetic radiation may be established so that when the control system (6) determines that an appropriate threshold level of electromagnetic radiation has been received, the threshold amount triggers the control system to achieve the desired modulation.

As mentioned earlier, the entire torque sensing system can be utilized in non-shade applications. These applications may vary greatly as well as the type of modulation desired. While in the shade application it is envisioned that a simple on/off modulation is all that is initially necessary, it is possible to use such a torque sensing device to achieve other modulations ranging from gear shifting to speed control. In a gear shift system, shown in FIG. 2 as one type of control system (6), one might utilize multiple gears and shift between those gears based upon the type of sensing or parameters experienced. Furthermore, it is also possible that the degree of torque change experienced could be used for appropriate control. It might also be helpful to note that the system could be adapted for roller application in which a roller might feed or reel in or out an item, as shown in the design of FIG. 1. Thus, an electromagnetic interference device could be configured to react to the torque on the roller itself to achieve the desired modulation.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure.

It should be understood that a variety of changes may be made without departing from the essence of the invention. Such chances are also implicitly included in the description. They still fall within the scope of this invention. A broad disclosure encompassing both the explicit embodiment(s) shown, the great variety of implicit alternative embodiments, and the broad methods or processes and the like are encompassed by this disclosure.

In addition, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Where the invention is described in device-oriented terminology, each element of the device implicitly performs a function. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical element disclosed should be understood to encompass a disclosure of the action which that physical element facilitates. Regarding this last aspect, the disclosure of a "modulator" should be understood to encompass disclosure of the act of "modulating" —whether explicitly discussed or not—and, conversely, were there only disclosure of the act of "modulating", such a disclosure should be understood to encompass disclosure of a "modulator". Such changes and alternative terms are to be understood to be explicitly included in the description.

I claim:

1. A torque-based control system, comprising:
   a. a drive system which supplies torque to operate an item and which comprises at least two take-up cords;

b. an electromagnetic alteration element which responds to a change in said torque as said torque is applied through said drive system and which comprises an electromagnetic interference device responsive to at least two of said take-up cords;
c. an electromagnetic sensor responsive to said electromagnetic alteration element; and
d. a drive modulator responsive to said electromagnetic sensor and to which said drives system is responsive.

2. A torque-based control system as described in claim 1 wherein said electromagnetic interference device comprises a plurality of rotating elements.

3. A torque-based control system as described in claim 2 wherein said electromagnetic interference device comprises at least three adjacent rotating elements.

4. A torque-based control system as described in claim 2 wherein said drive modulator is activated by the presence of electromagnetic radiation.

5. A torque-based control system as described in claim 2 wherein said drive modulator is activated by the absence of electromagnetic radiation.

6. A torque-based control system, comprising:
a. a drive system which supplies torque to operate an item and which comprises at least two take-up cords;
b. an electromagnetic alteration element which responds to a change in said torque as said torque is applied through said drive system and which comprises an electromagnetic interference device responsive to at least two of said take-up cords;
c. an electromagnetic sensor responsive to said electromagnetic alteration element;
d. a drive modulator responsive to said electromagnetic sensor and to which said drive system is responsive; and
e. an electromagnetic source which emits electromagnetic radiation, which is configured so that said electromagnetic radiation passes in the vicinity of said electromagnetic alteration element and which comprises a light source that comprises a light emitting diode.

7. A torque-based control system as described in claim 6 wherein said electromagnetic interference device comprises a plurality of rotating elements.

8. A torque-based control system as described in claim 7 wherein said electromagnetic interference device comprises at least three adjacent rotating elements.

9. A torque-based control system as described in claim 7 wherein said drive modulator is activated by the presence of electromagnetic radiation.

10. A torque-based control system as described in claim 7 wherein said drive modulator is activated by the absence of electromagnetic radiation.

11. A torque-based control system, comprising:
a. a drive system which supplies torque to operate an item;
b. an electromagnetic alteration element which responds to a change in said torque as said torque is applied through said drive system wherein said electromagnetic alteration element comprises an electromagnetic interference device which comprises:
 i. a first radially pivoting element having an axis and at least one first element electromagnetic alteration projection and at least one first element ambient area wherein said first element electromagnetic alteration projection and said first element ambient area are radially adjacent on said first radially pivoting element; and
 ii. a second radially pivoting element having an axis and at least one second element electromagnetic alteration projection and at least one second element ambient area wherein said second element electromagnetic alteration projection and said second element ambient area are radially adjacent on said second radially pivoting element;
 and wherein said first radially pivoting element and said second radially pivoting element are axially adjacent;
c. an electromagnetic sensor responsive to said electromagnetic alteration element; and
d. a drive modulator responsive to said electromagnetic sensor and to which said drive system is responsive.

12. A torque-based control system, comprising:
a. a drive system which supplies torque to operate an item;
b. an electromagnetic alteration element which responds to a change in said torque as said torque is applied through said drive system;
c. an electromagnetic sensor responsive to said electromagnetic alteration element;
d. a drive modulator responsive to said electromagnetic sensor and to which said drive system is responsive; and
e. an electromagnetic source which emits electromagnetic radiation, is configured so that said electromagnetic radiation passes in the vicinity of said electromagnetic alteration element and which comprises a light source that comprises a light emitting diode, wherein said electromagnetic alteration element comprises an electromagnetic interference device which comprises:
 i. a first radially pivoting element having an axis and at least one first element electromagnetic alteration projection and at least one first element ambient area wherein said first element electromagnetic alteration projection and said first element ambient area are radially adjacent on said first radially pivoting element; and
 ii. a second radially pivoting element having an axis and at least one second element electromagnetic alteration projection and at least one second element ambient area wherein said second element electromagnetic alteration projection and said second element ambient area are radially adjacent on said second radially pivoting element;
 wherein said first radially pivoting element and said second radially pivoting element are axially adjacent.

* * * * *